United States Patent
Wojciak et al.

(10) Patent No.: US 11,663,058 B1
(45) Date of Patent: May 30, 2023

(54) PREEMPTIVE FILTERING OF EVENTS OF AN EVENT BUS WITH A DETERMINISTIC FILTER

(71) Applicant: Amazon Technologies, Inc., Seattle, WA (US)

(72) Inventors: Jakub Wojciak, West Vancouver (CA); James Lance Eather, Vancouver (CA); Rogerio Sathio Yamaguti, Vancouver (CA); Shawn Patrick Jones, Boulder, CO (US); Arijit Choudhury, Mountain View, CA (US); Rishi Baldawa, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 17/306,862

(22) Filed: May 3, 2021

(51) Int. Cl.
G06F 9/54 (2006.01)
G06F 9/38 (2018.01)
G06F 18/2113 (2023.01)

(52) U.S. Cl.
CPC ............ G06F 9/542 (2013.01); G06F 9/3836 (2013.01); G06F 18/2113 (2023.01)

(58) Field of Classification Search
CPC ..... G06F 9/542; G06F 16/1734; H04L 41/06; H04L 41/0604
USPC ......................................................... 719/318
See application file for complete search history.

(56) References Cited

U.S. PATENT DOCUMENTS

| 7,548,908 | B2 | 6/2009 | Fu et al. |
| 8,321,528 | B2* | 11/2012 | Sailhan ............... H04L 41/0631 709/217 |
| 9,171,153 | B2 | 10/2015 | Jorgensen |
| 9,548,910 | B2 | 1/2017 | Khan |
| 2004/0028069 | A1 | 2/2004 | Tindal et al. |
| 2021/0286812 | A1* | 9/2021 | Neugebauer ........ G06F 16/9035 |

* cited by examiner

Primary Examiner — Andy Ho
(74) Attorney, Agent, or Firm — S. Scott Foster; Kowert, Hood, Munyon, Rankin & Goetzel, P.C.

(57) ABSTRACT

A probabilistic data structure such as a bloom filter may be used to provide a space efficient representation of rules that define events of interest to sources and may be used to reduce the number of events ingested by an event bus system. An event bus system may generate a probabilistic data structure based on the rules that may be used at the event source as a filter. The probabilistic data structure predetermines whether the events to be sent to the event bus system will be of interest to any event targets and if an event is of no interest to any of the event targets, the event will not be sent.

20 Claims, 8 Drawing Sheets

PREEMPTIVE FILTERING OF EVENTS OF AN EVENT BUS WITH A DETERMINISTIC FILTER

BACKGROUND

A Service Oriented Architecture (SOA), including microservices architecture, is an architecture that decomposes a software application into discrete services that can then be built, deployed, and scaled independently allowing highly scalable and flexible applications. As an application using an SOA grows, the traffic of events that are published and received between the discrete services also grows. In order to facilitate the complex traffic of events, an event bus system may be used to mediate the events being sent and received and thereby further decouple the various microservices.

Figure 1A:
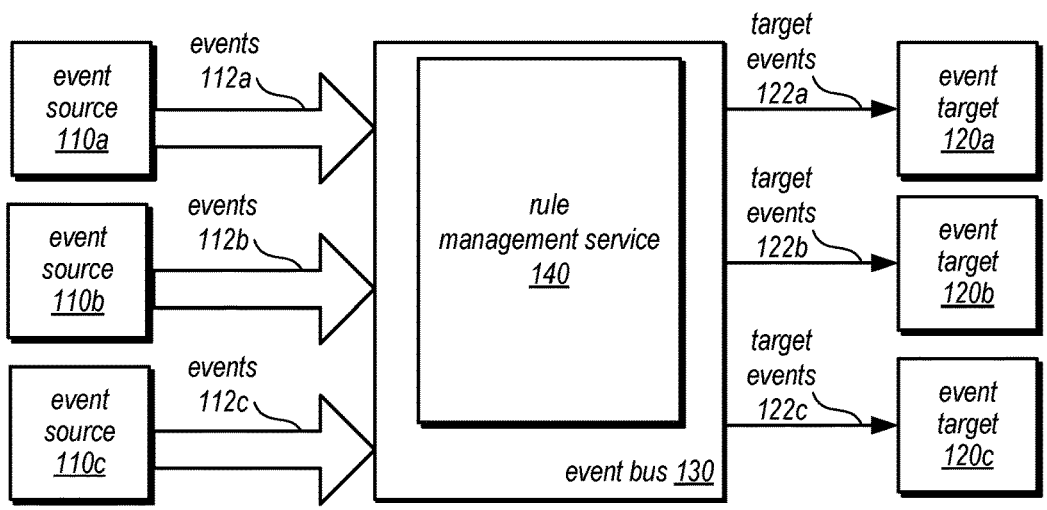
FIGS. 1A-1B are logical block diagrams that illustrate reducing the number of events sent to the event bus by filtering events that are not of interest to the event targets by using probabilistic data structures.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various techniques for reducing the number of events sent to an event bus system by filtering events that are not of interest to event targets are described herein. An event bus system may act as a mediator between a variety of event sources and event targets that receive and use events. In various embodiments, an event source for an event bus system may be various applications such as a Software-as-a-Service (SaaS) applications, an internal service application, or an external service application. Similarly, an event target may be various applications such as a Software-as-a-Service (SaaS) applications, an internal service application, or an external service application. An event bus system may allow for alleviation of tight coupling between different applications acting as event sources and event targets, resolving problems that may arise as more and more services are added. For example, an event bus system may coordinate the various Application Programming Interfaces (APIs) that are involved in the addition of new services to prevent errors arising from dependencies.

In various embodiments, an event bus system may be able to interact with downstream services by selecting and filtering events, thereby taking on the complexity of ensuring that events are propagated appropriately. For example, events may include various signals, indications, messages, communications, or other notifications of changes to and/or the state of a system that is an event source. This allows the consumers and sources to be further decoupled. For example, in order for various services to consume events, instead of updating all of the services involved, the event bus system may route the events to appropriate services according to a rule that determines how the event bus system handles the event. In this way, event bus systems can be adapted to new services to participate in the sending and receiving of events.

As more and more event sources and event targets are added, the traffic of events that are published and received between discrete services also grows. Because an event bus system mediates between the event sources and event targets, the event bus system may have to ingest a large number of events. However, it may be that not all of the events ingested have event targets. For instance, a reported event may not be of use or interest to event targets, and therefore a rule for routing events may be specified to have the event bus system drop or otherwise refrain from sending those events to an event target. Ingestion of events that are not of interest to any of the event targets results in a waste of resources at the event bus system (as well as event sources), consuming networking, processor, memory, and/or other computing resource capacity that could otherwise be used to handle other tasks or perform event routing more quickly.

In order to reduce the number of events sent to the event bus system by the sources, a probabilistic data structure may be used to deterministically filter out at the event source those events that would not be sent by the event bus system to a target. Various types of probabilistic data structures may be implemented in some embodiments. For example, probabilistic data structures such as bloom filters may be used to provide a space efficient representation of events to be filtered by the event sources.

Instead of creating an exact replica of the event rules, a probabilistic data structure used as a filter (which may also be referred to as "filter" or "filters" such as a bloom filter), may be used to create a representation of the rules that could be orders of magnitude smaller. For example, in one embodiment, the probabilistic data structure may be a bloom filter described as a bit array (which may sometimes be referred to as a bit map) that can be transmitted to event sources. Event Sources can then utilize the bloom filter by checking one or more entries in the bit array to determine if an event should be sent to the event bus system according to whether the one or more entries are set (e.g., to a value of "1"). Moreover, different probabilistic data structures may support varying degrees of compression or size reduction, which may be related to the number of acceptable false-positives, allowing for a probabilistic data structure to be right-sized to a desirable size for representing event rules.

Figure 1B:
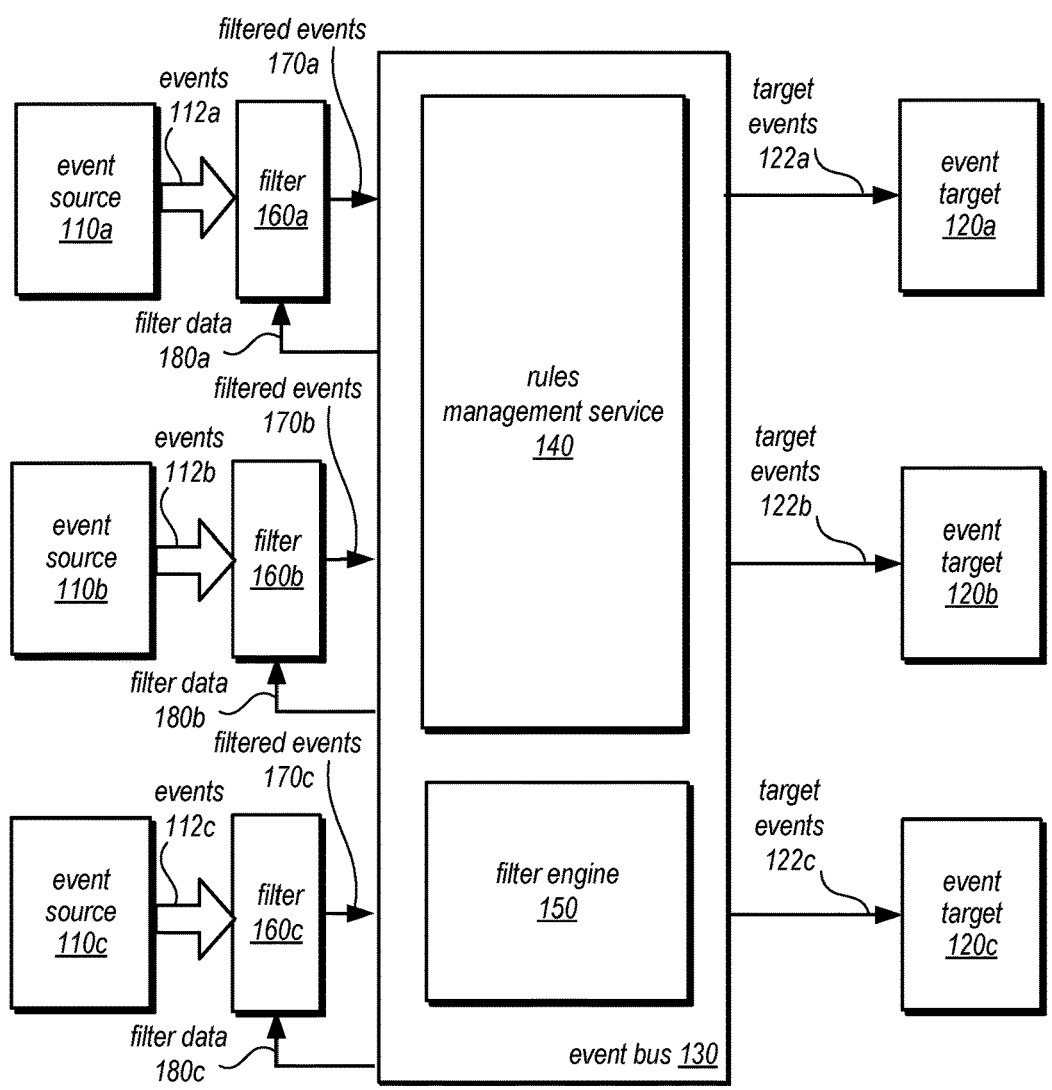

FIGS. 1A and 1B are logical block diagrams that illustrate reducing the number of events sent to the event bus by filtering events that are not of interest to the event targets by using probabilistic data structures. Multiple event sources 110a, 110b, 110c, generate events 112a, 112b, 112c and transmits them to the event bus system 130. Event bus system 130 may be implemented as service as part of a provider network, such as event bus service 210 discussed below, as well as various other systems or applications that may utilize an event bus system separate from systems implementing event sources 110 and event targets 120. The event sources 110 may be systems, services, or applications such as a Software-as-a-Service (SaaS) applications, an internal or external service application that generates event data or streams of event data. An event may refer to each individual event data that may be published or otherwise sent in various data formats such as JavaScript Object Notation (JSON), Binary JSON (BSON), Extensible Markup Language (XML), YAML Ain't Markup Language (YAML), etc. The events 112a, 112b, 112c may be an ongoing series of events to make up streams of event data or event streams, in some embodiments.

Event bus 130 may receive the events 112a, 112b, 112c and route the events to event targets 120a, 120b, 120c. Similar to event sources, the event targets may be systems, services, or applications such as a Software-as-a-Service (SaaS) applications, an internal service application that can receive event data or streams of event data. Furthermore, the event targets may be a Hypertext Transfer Protocol (HTTP) invocation endpoint using an API destination. API destinations are targets that can be invoked using an HTTP request. The event bus 130 may invoke an HTTP endpoint wherein the event is sent as a payload within the HTTP request. Various HTTP methods such as GET or POST may be used in the HTTP request.

A rule management service 140 manages the rules in which the event bus system receives and utilizes rules to route events 112a, 112b, 112c to event target 120a, 120b, 120c. The target events 122a, 122b, 122c results from the event bus applying rules to route the appropriate events to the appropriate event target 120. In various embodiments, rules may be conditions that inform the event bus system how to match incoming events to event targets and route them accordingly (e.g., as discussed in detail below with regard to FIG. 4). A single rule can route an event to multiple targets, in some embodiments. Rules may be specified or sent to the rule management service 140 via an interface for event bus 130 and published in various data formats similar to events such as JSON, BJSON, XML, YAML, etc. Rules may be used by the rule management service 140 to process events in parallel and need not be processed in a particular order. A rule management service 140 may include instructions to modify the event to be sent to by the event bus system to the event targets such as passing certain portions of the event or overwriting certain portions of the event with a predefined value.

A filter engine 150 of the event bus system 130 generates one or more probabilistic data structures based on the rules of the rule management service and sends a copy of the respective one of the one or more probabilistic data structures as filter data 180a, 180b, and 180c to the event sources 110a, 110b, 110c to provide a ready representation of the rules from which to determine whether to filter out events that are not of interest to at least one event target 120. A probabilistic data structure, such as a bloom filter, may allow for constant memory space within the event source and also allow faster processing as compared to querying the event bus system 130. Probabilistic data structures may include, but are not limited to, Bloom filters, Cuckoo filters, Count-min sketch (CM sketch), Top-K, Bloomier filters, and Xor filters. The probabilistic data structure may be a simple byte array that can be transmitted to event sources. As discussed in detail below with regard to FIG. 3, the filter engine 150 may interact with the rule management service 140 to generate filter data 180a, 180b, 180c that are used to send to the event source probabilistic data structures or updates for the probabilistic data structure. Using the probabilistic data structures, event sources 110a, 110b, and 110c can determine if the events 112a, 112b, 112c wherein the events are to be received by at least one event target according to the rules of the rules management service 140. As depicted in FIG. 1B, by providing filter data 180a, 180b, and 180c to allow event sources 110a, 110b, and 110c to send filtered events 170a, 170b, and 170c, computational resources of event bus system 130 may be saved, increasing event busy system 130 performance (e.g., allowing event bus system 130 to handle greater numbers of events and/or route events faster to event targets).

Please note, FIG. 1 is provided as a logical illustration of the event source, events, rule management service, filter engine, and event targets is not intended to be limiting as to the physical arrangement, size, or number of components, modules, or devices to implement such features. For instance, there may be more than three event sources and event targets that are mediated by the event bus system. There may also be multipole event bus systems employing a similar architecture.

Figure 2:
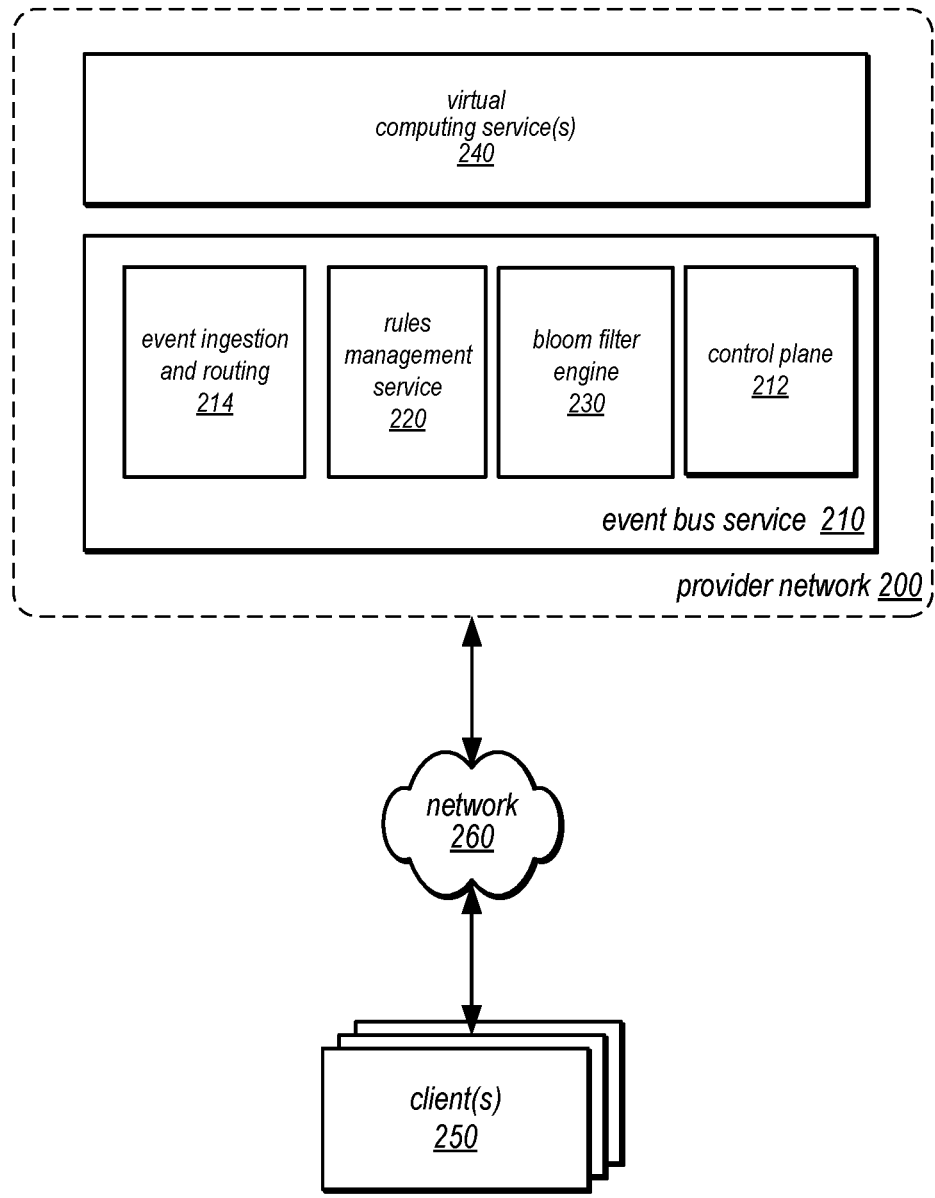
FIG. 2 is a logical block diagram illustrating a provider network that implements an event bus service.

FIG. 2 is a logical block diagram illustrating a provider network that implements an event bus service, according to some embodiments. A provider network may be a private or closed system or may be set up by an entity such as a company or a public sector organization to provide one or more services (such as various types of virtual computing services) accessible via the Internet and/or other networks to clients 250, in some embodiments. The provider network may be implemented in a single location or may include numerous provider network regions, that may include one or more data centers hosting various resource pools, such as collections of physical and/or virtualized computer servers, storage devices, networking equipment and the like (e.g., computing system 800 described below with regard to FIG. 8), needed to implement and operate the event bus service 210 (including the rule management service 220 and bloom filter engine 230 within) and virtual computing services 240 storage services offered by the provider network within the provider network 200. The provider network provisions and patches the one or more data centers hosting various resource pools to allow automatic scaling and built-in high availability.

A number of clients (shown as clients 250) may interact with a provider network 200 via a network 260, in some embodiments. The client may be an event source wherein the event source generates events to be transmitted to the event bus service. A probabilistic data structure, may be set by the event bus service to the clients such that the events that are not of interest to the various virtual computing services event bus service may be filtered from being sent to the event bus service. Provider network 200 may implement event bus service 210, rules management service 220, filter service 230, and/or virtual computing services 240. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. Generally speaking, client(s) 250 may encompass any type of clients that can submit network-based services requests to provider network 200 via network 260, including requests for event bus services. For example, a given client 250 may include a suitable version of a web browser, or may include a plug-in module or other type of code module may execute as an extension to or within an execution environment provided by a web browser. Alternatively, a client 250 may encompass an application such as a database application (or user interface thereof), a media application, an office application or any other application that may make use of the event bus service 210 to send events to make available to the virtual computing services for consumption, receive events from event bus service 210, and/or specify rules for events, in some embodiments. In some embodiments, such an application may include sufficient protocol support (e.g., for a suitable version of HTTP) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document-based or message-based network-based services architecture, or another suitable network-based services architecture.

Although client(s) 250 are illustrated as external to provider network 200, in some embodiments, clients may be implemented with provider network 200, such as applications or systems implemented on other virtual computing resources that may make use of event bus service 210.

In some embodiments, clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 200 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based event bus service. It is noted that in some embodiments, clients 250 may communicate with provider network 200 using a private network rather than the public Internet. For example, clients 250 may be provisioned within the same enterprise as the event bus service 210. In such a case, clients 250 may communicate with platform 200 entirely through a virtual private network 260 (e.g., a LAN or WAN that may use Internet-based communication protocols but which is not publicly accessible).

Generally speaking, provider network 200 may implement one or more service endpoints may receive and process network-based services requests, such as the receipt of various events and receipt of rules for handling the events. For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements event bus service 210, storage service 220 and/or another virtual computing service 230 for processing. In other embodiments, provider network 200 may be implemented as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In some embodiments, provider network 200 may implement various client management features. For example, provider network 200 may coordinate the receiving of events from the clients or the sending of probabilistic data structures and its updates. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of event bus service 210 or virtual computing service(s) 240 (or the underlying systems that implement those services such as the rules management service 220 or bloom filter engine 230).

In some embodiments, event bus service 210 may route events received from event sources to one or more event targets according to various rules, which may be specified via an interface for event bus service 210. The traffic and operations of event bus service 210 may broadly be subdivided into two categories in various embodiments: control plane operations carried over a logical control plane and data plane operations carried over a logical data plane Event bus service 210 may implement event ingestion and routing 214, which may act as a data plane for event bus service 210. For example, while the data plane represents the movement of event data through event bus service 210 to an event target, the control plane 212 represents the movement of control signals through event bus service 210. The control plane generally includes one or more control plane components distributed across and implemented by one or more control servers. Control plane traffic generally includes administrative operations, such as system configuration and management (e.g., resource placement, hardware capacity management, diagnostic monitoring, system state information). Data plane traffic generally includes non-administrative operations such as routing of event data. Certain control plane 212 components (e.g., tier one control plane components such as the control plane for event bus service 210) may be implemented on a separate set of servers from the data plane servers, while other control plane 212 components (e.g., tier two control plane components such as analytics services) may share the virtualized servers with the data plane, and control plane 212 traffic and data plane traffic may be sent over separate/distinct networks.

In some embodiments, event bus service 210 may implement user authentication and access control procedures as part of control plane 212. For example, control plane 212 may determine whether a request is authorized to publish events, specify rules, and/or receive events from event bus service 210. The control plane 212 may determine such authorization by, for example, evaluating an identity, password or other credential against credentials associated with a particular event source requesting the event bus service 210 to ingest an event data. For example, if a client 250 does not have sufficient credentials to publish events to the event bus service 210, the proxy node may reject the corresponding network-based services request, for example by returning a response to the requesting client 250 indicating an error condition. Various access control policies may be stored as records or lists of access control information by event bus service 210 and the virtual computing services 240. In some cases, the accounting and/or credentialing services of provider network 200 may be unnecessary for internal clients such as administrative clients or between service components within the same enterprise.

Figure 3:
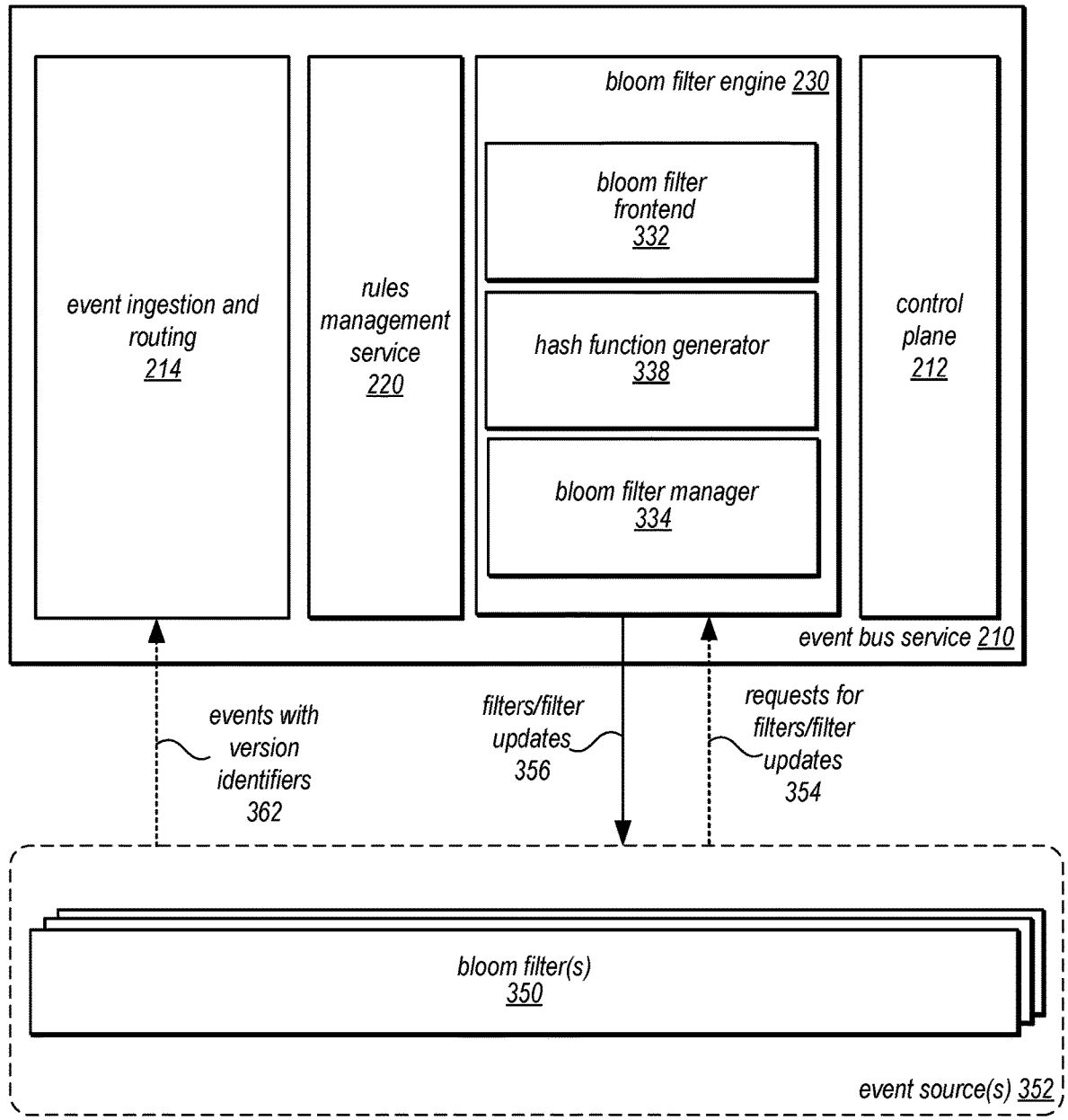
FIG. 3 is a logical block diagram illustrating various components of an event bus service and the filter engine and their interaction with filters, according to some embodiments.

FIG. 3 is a logical block diagram illustrating various components of an event bus service 210 and the bloom filter engine 230 and their interaction with filters, according to some embodiments. In this example, event bus service 210 includes respective rules management service 220, bloom filter engine 230, and control plane 212. The control plane 212 coordinates the rule management service 220 and the bloom filter engine 230 such that the pieces are able to work in conjunction with one another as well as able to handle various functions of the event bus service 210 such as routing of bloom filter(s) 350 to respective event source(s) 352. The control plane 230 may also facilitate authentication and access control procedures and may determine whether the event source 352 is authorized to publish events to the event bus service 210 or is authorized to request a filter/filter updates 356.

In some embodiments, the filter frontend 332 may receive requests by the event source(s) 352 that houses the respective bloom filter(s) 350. The filter frontend 332 may detect one or more changes in the rules of the rules management service 220, and based on the detected change initiate a generation of a new filter and transmit the new updated filter to one or more of the event sources.

Event bus service 210 may implement a bloom filter engine 230 that in turn implements a hash function generator 338. Hash function generator 338 may be used to generate the probabilistic data structure such as a filter. In one embodiment, a set of independent uniform hash functions may be generated based on a set of rules of the rule management service 220 wherein the keys of the hash functions may represent various aspects of the rules. In some embodiments, the bloom filter 350 may be stored in a bit map wherein the bits of the bit map are generated by hashing each element into the bit map using a set of independent uniform hash functions. In another embodiment, different bloom filters 350 may support varying degrees of compression or size reduction, which may be related to the number of acceptable false-positives, allowing for the bloom filter 350 to be right-sized to a desirable size for representing event rules.

In some embodiments, as the rules management service 220 receives one or more changes to the rules, the filters that are generated by the bloom filter engine 230 may be updated to reflect that change. In some embodiments, the changes to the rule management service 220 triggers through the filter frontend 332 to generate a new filter. In some embodiments, the changes in the rules may generate an update to the filter that may be used to modify the bits of the bit map to reflect only the changes in the rules (e.g., an update that is performed by modifying some entries in a bit array without modifying other entries in the bit array). In some embodiments, the filters may be versioned, and the version of the probabilistic data structure may be increased based on one or more changes to the rules. The filters may moreover be assigned by a "lifespan", "time-to-live" (TTL), or an expiration time period after which it will no longer be considered for filtering by an event source (e.g., as the filter may no longer reliably reflect the current state of the rules for routing events) 350. The expiration of such filter may trigger the event source 350 to request an updated filter/filter updates 354.

In some embodiments, event bus service 210 may implement bloom filter engine 230 that implements a bloom filter manager 334. In some embodiments, the bloom filter manager 334 may create copies of the filter that is generated and send them using the filter frontend 332 to the various event source(s) 352. The request for filter 350 may arise from a request from the event source 352 or may be determined by the bloom filter manager 334.

New filters, updated filters, or updates to a portion of a filter may be provided, as indicated at 356, to event sources 352, in different scenarios. For example, event sources 352 may request 354 a filter (or update to a filter) periodically (e.g., by polling for filter updates) or after the expiration time period for a filter passes. In some embodiments, a push-based model may be implemented by event bus service 210, where bloom filter engine 230 sends updated versions of a bloom filter (or updates to portions of a bloom filter) 356 after generating the update (e.g., in response to a new rule or modification to an existing rule). In some embodiments, filters may be assigned a version identifier (e.g., a timestamp, sequence number, etc.). When events are provided to event bus service 210 for routing to event targets, a version identifier for the filter applied at event source 352 may be included, such as events with version identifiers 362, in some embodiments. If a version of a filter indicates that the event source has an older, stale, or otherwise not current version of the filter, then the updated filter, with an assigned version identifier later or otherwise indicative of a more current version of the filter may be provided, as indicated at 356, to replace the version of the filter at the event source 352.

Bloom filters may be source specific bloom filters wherein the filters are filters specific to event sources, and the rules with which the filters are generated also pertain to specific sources. For example, a source specific bloom filter may be generated for Source "A" by the event bus service 210 wherein the hash function generator 338 may be used to generate a set of independent uniform hash functions based only on a set of rules of the rule management service 220 describing events generated by Source "A". The source specific bloom filters are sent only to the respective event sources specified. Furthermore, updated versions of a source specific bloom filters (or updates to portions of a source specific bloom filter) may be generated and sent to the respective event source when the rules pertaining to the specific event source are changed or added.

Figure 4:
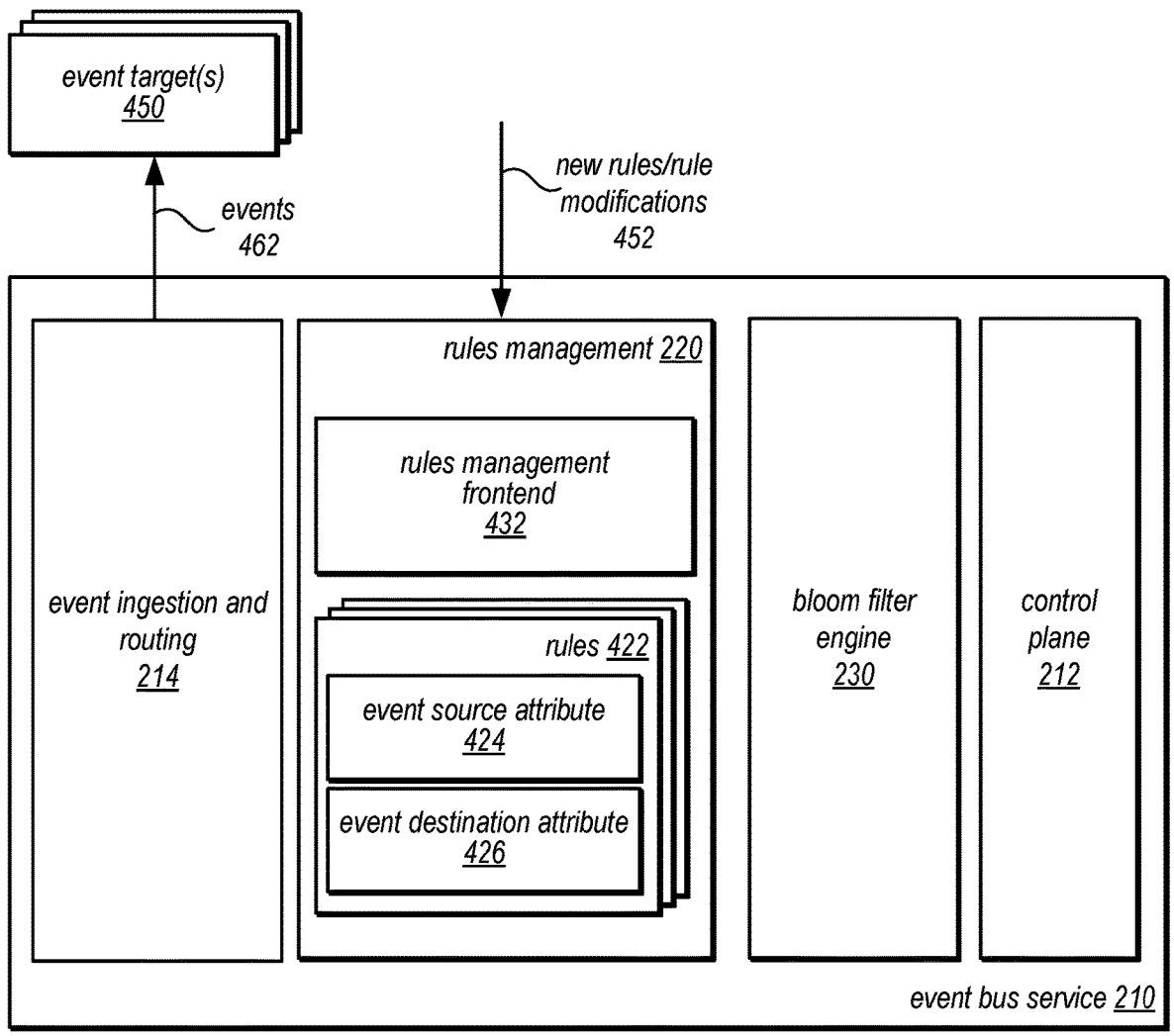
FIG. 4 is a logical block diagram illustrating rules management service and its interaction with event targets, according to some embodiments.

FIG. 4 is a logical block diagram illustrating rules management service and its interaction with event targets, according to some embodiments. In this example, event bus service 210 includes respective rules management service 220, bloom filter engine 230, and control plane 212. The control plane 230 may also facilitate authentication and access control procedures and may determine whether the event target is authorized to send new rules/rule modifications 452 to the event bus service 210 or authorized to request a filter.

Event bus service 210 may implement a rule management service 220 that implements rule management frontend 432. The rule management frontend 432 may receive rules/rule modifications 452 from the event targets 450 or other entities that are authorized to receive events generated by event sources. Rules 422 may be sent to the rule management, as indicated at 452, in various data formats such as JSON, BJSON, XML, YAML, etc.

In some embodiments, the rule management service 220 stores rules 442 which are conditions that inform the event ingestion and routing 214 how to match incoming events to event targets and route them to event target(s) 450 accordingly. Rule 422 may comprise event source attribute 424 that describes the source from which the event was generated such as the entity of the event source or the category of event sources. Rule 422 may also comprise event destination attribute 426 that describes the event target 450, in some embodiments. Event destination attribute 426 may include any number of event target attributes such as an entity of the event target, the category of event target, or the location of the event target. Rules 422 may be used by the rule management service 220 to process events in parallel and need not be processed in a particular order. In some embodiments, the rule management service 220 may receive changes to the rules 422 and would inform the bloom filter engine 230 to trigger subsequent changes to the filter to be generated and send to event sources. In some embodiments, the rule management service 220 may determine that changes to rules 422 have been made with respect to rules having a specific event source attribute. The rule management service 220 may inform the bloom filter engine 230 to trigger subsequent changes to the source specific filter associated with the specific event source attribute 424 and may trigger the bloom filter engine 230 to generate a source specific bloom filters (or updates to portions of a source specific bloom filter).

Figure 5:
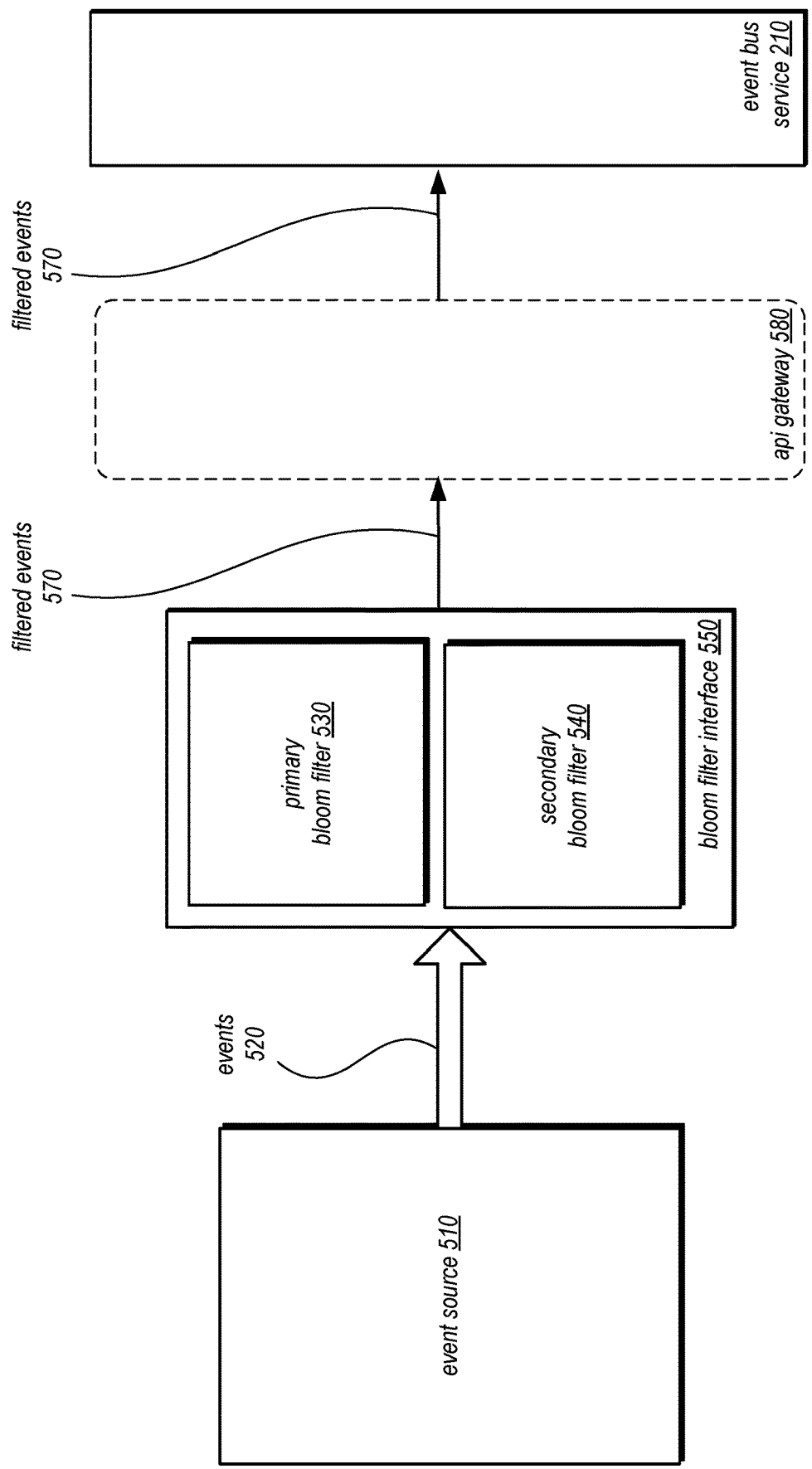
FIG. 5 is a logical block diagram illustrating the use of filters, including primary and secondary filters, according to some embodiments.

FIG. 5 is a logical block diagram illustrating the use of filters, including primary and secondary filters, according to some embodiments. In this example, an event source 510 generates events 520 wherein the event sources may be various systems, services, or applications such as a SaaS application, an internal or external service application that generates events 520. Events 520 may be may in various data formats such as JavaScript JSON, BJSON, XML, YAML, etc. and are sent to the filter interface 550 to determine whether or not it should be sent to the event bus service 210. The bloom filter interface 550 and the set of filters, whether primary bloom filter 530 or the secondary bloom filter 540, are illustrated as being implemented outside of the event source 510 but in some embodiments may be implemented within. Furthermore, in some embodiments the events 520 may be in the form of internal queries. The primary filter 530 and the secondary filter 540 works in conjunction and may be used to facilitate the update of the filter as described below in FIG. 7. For example, there may be multiple sets of filters which act as a primary bloom filter 530 and a secondary bloom filter 540. When an update to the filters are sent to the bloom filter interface 550, the updated filter may become the secondary bloom filter 540 that will furthermore validate the events 520 that have not been sent to the event bus service 210.

The events 520 that do pass the filters are then sent to the event bus service 210 as filtered events 570. In one embodiment, the filtered events 570 may be sent to the event bus service 210 through the API gateway 580. In some embodiments, the API gateway 580 may facilitate communication between the filter interface 550 (in some embodiments the event source 510 housing the filter interface 550) and the event bus service 210. The API gateway 580 may facilitate processing of concurrent API calls, including traffic management, and authorization and access control. The API calls may be performed over a secure proxy connection (e.g., one managed by a gateway control plane), or may be performed over the public network or, alternatively, over a private channel such as a virtual private network (VPN) connection. These and other APIs to and/or between components of the event source 510, bloom filter interface 550, api gateway 580, and event bus service 210 described herein may be implemented according to different technologies, including, but not limited to, Simple Object Access Protocol (SOAP)

technology and Representational state transfer (REST) technology (i.e. an architectural style for distributed hypermedia systems). For example, these APIs may be, but are not necessarily, implemented as SOAP APIs (protocol for exchanging information in the context of Web-based services) or RESTful APIs. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support communication between the event source 510 and the filter interface 550 and the event bus service 210.

Figure 6:
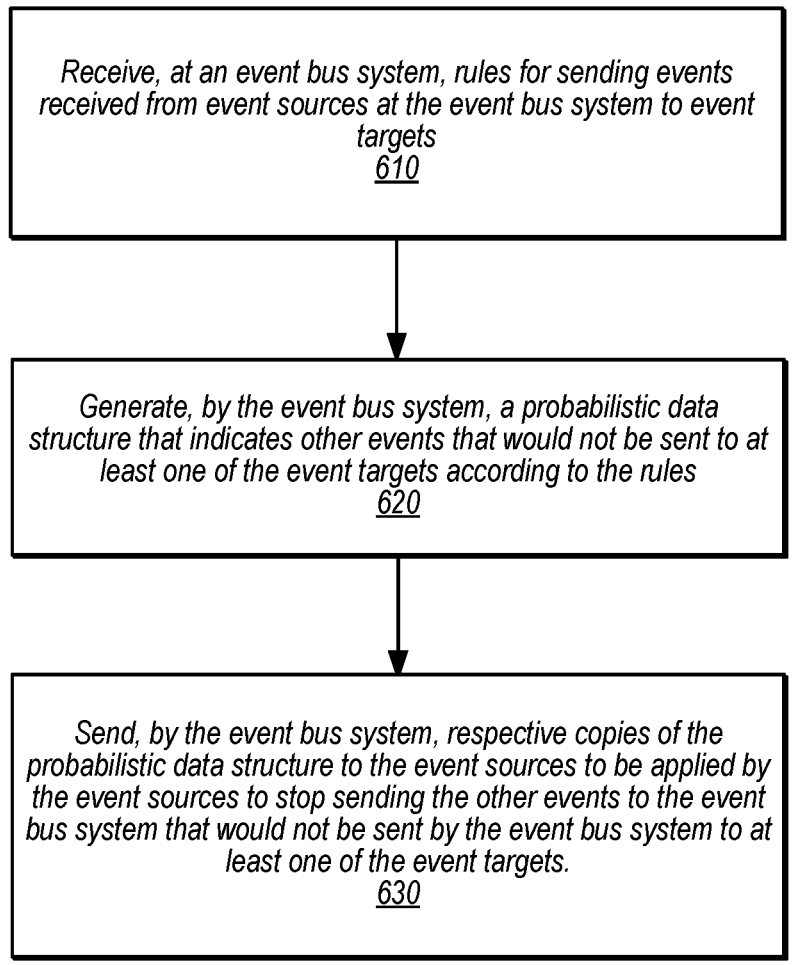
FIG. 6 is a high-level flowchart illustrating various methods and techniques for reducing the number of events sent to the event bus by filtering events that are not of interest to the event targets by using probabilistic data structures.

The event bus service 210 discussed in FIGS. 2 through 5 provide examples of a system that illustrates reducing the number of events sent to the event bus by filtering events that are not of interest to the event targets by using probabilistic data structures. FIG. 6 is a high-level flowchart illustrating various methods and techniques for reducing the number of events sent to the event bus by filtering events that are not of interest to the event targets by using probabilistic data structures, according to some embodiments. Various different systems and devices may implement the various methods and techniques described below, either singly or working together. For example, an event bus system may implement the various methods described above. Alternatively, a combination of different systems and devices may implement the various methods. Therefore, the above examples and or any other systems or devices referenced as performing the illustrated method, are not intended to be limiting as to other different components, modules, systems, or configurations of systems and devices.

As indicated at 610, rules for sending events received from event sources at an event bus system (e.g., event bus system 130 in FIG. 1) to event targets may be received, in some embodiments. The rules may be conditions that inform the event bus system how to match incoming events to event targets and route them accordingly. A single rule can route an event to multiple targets and may be received by the event bus system in various data formats such as JSON, BJSON, XML, YAML, etc. Rules may be used by the rule management service to process events in parallel and need not be processed in a particular order. A rule management service may include instructions modify the event to be sent to by the event bus system to the event targets such as passing certain portions of the event or overwriting certain portions of the event with a predefined constant. Rules may be defined in variety of ways other than a receipt from event targets such as through a direct user input or pre-defined default rules.

As indicated at 620, a probabilistic data structure that indicates other events that would not be sent to at least one of the plurality of event targets according to the plurality of rules may be generated. The probabilistic data structure may allow for constant memory space within the event source and also allow faster processing as compared to querying the event bus system. The probabilistic data structures include Bloom filters, Cuckoo filters, Count-min sketch (CM sketch), Top-K, Bloomier filters, and Xor filters. The probabilistic data structure may be a simple byte array that can be transmitted to event sources. Probabilistic data structures may be a representation of the rules in a simple byte array that can be copied and transmitted to event sources. The event sources can then easily determine if events will be sent on to event targets by the event bus system.

As indicated at 630, the event bus system may send respective copies of the probabilistic data structure to the plurality of event sources to be applied by the event sources to stop sending the other events to the event bus system that would not be sent by the event bus system to at least one of the plurality of event targets. For example, an event source may query the probabilistic data structure and forego sending events based on whether or not there are rules that would result in an event target receiving the event.

Figure 7:
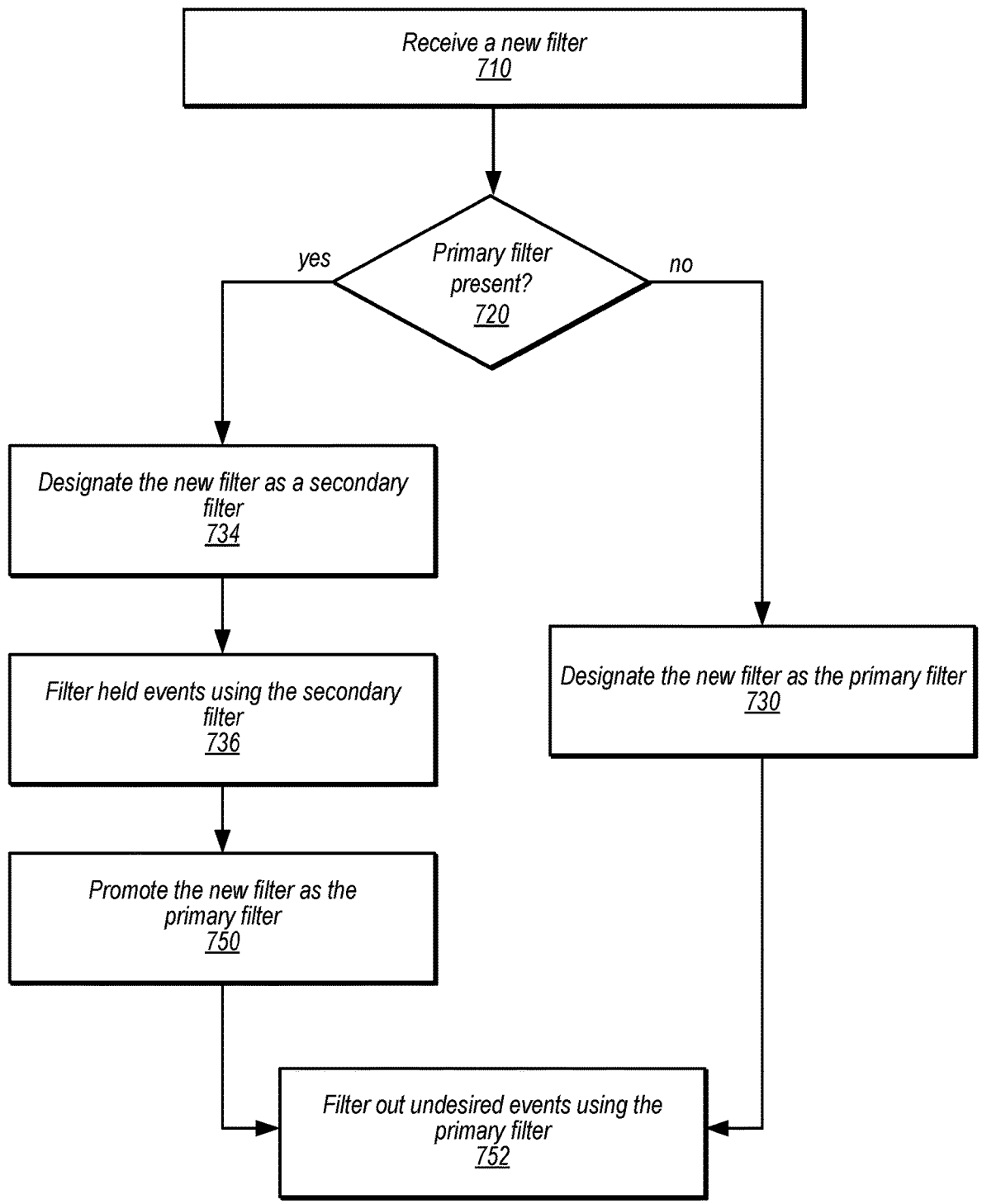
FIG. 7 is a high-level flowchart illustrating various methods and techniques for designating primary and secondary filters and marking as unreliable filters past their expiration, according to some embodiments.

FIG. 7 is a high-level flowchart illustrating various methods and techniques for designating primary and secondary filters and marking as unreliable filters past their expiration, according to some embodiments. As indicated at 710, an event source receives a new filter generated based on the current rules from the rule management service. In some embodiments, the new filter may be a new update to a filter. A determination may be made as indicated at 720 as to whether a primary filter is present (e.g., a filter has previously been received by the event source such as filters that have previously been sent due to either an initial filter at the start of the service or subsequent filters sent to reflect the changes to the rules). If no primary filter is present, then as indicated at 730, the new filter may be designated as the primary filter. As the primary filter, the filter acts to determine whether the events generated should be sent to the event bus system.

If a primary filter is present, then as indicated at 734, the new filter is designated as the secondary filter. The secondary filter may act as a filter that will be referenced to validate events that have been determined by the primary filter as not of interest and dropped. In some embodiments, while the new filter is being implemented, the events that are not sent the event bus system are held. In some embodiments, when the new filter is a new update to a filter, a copy of the primary filter is made, and the updates applied to the copy—this updated filter is designated as the secondary filter. As indicated at 736, once the new filter is implemented, the held events are further filtered to check if any should be sent to the event bus system. Once this is complete, the new filter (or the updated filter) is promoted as the primary filter (replacing the previous primary filter). At this point, the undesired events are filtered out based on the primary filter alone, as indicated at 752.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
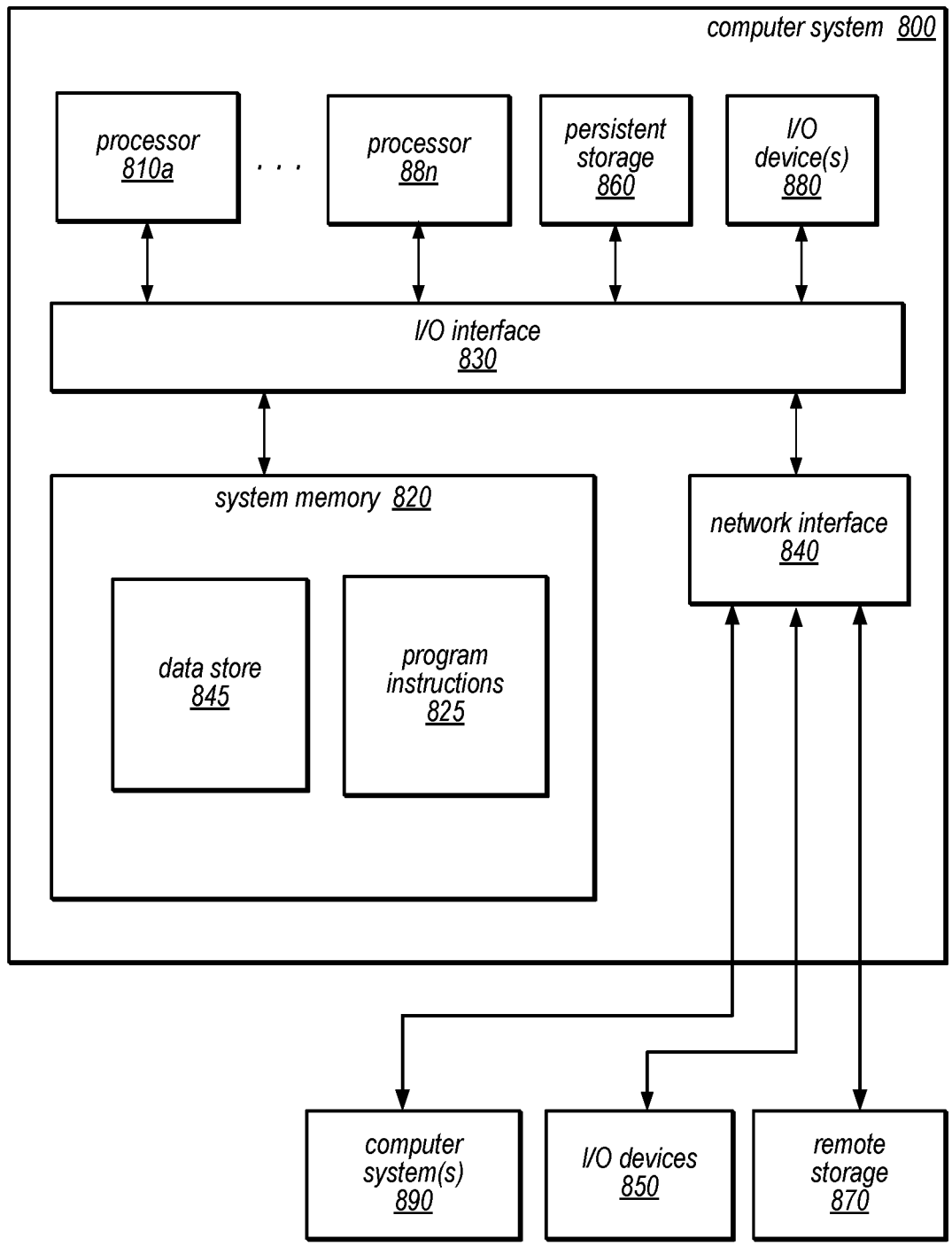
FIG. 8 is a block diagram illustrating an example computer system, according to various embodiments.

FIG. 8 is a block diagram illustrating a computer system, according to various embodiments. For example, computer system 800 may implement various features of an event source, event bus system, and/or event target, in various embodiments. Computer system 800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 800 includes one or more processors 810 (any of which may include multiple cores, which may be single or multi-threaded) coupled to a system memory 820 via an input/output (I/O) interface 830. Computer system 800 further includes a network interface 840 coupled to I/O interface 830. In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. The computer system 800 also includes one or more network communication devices (e.g., network interface 840) for communicating with other systems and/or components over a communications network (e.g. Internet, LAN, etc.). For example, a client application executing on system 800 may use network interface 840 to communicate with a server application executing on a single server or on a cluster of servers that implement one or more of the components of the event bus systems described herein.

In the illustrated embodiment, computer system 800 also includes one or more persistent storage devices 860 and/or one or more I/O devices 880. In various embodiments, persistent storage devices 860 may correspond to disk drives, tape drives, solid state memory, other mass storage devices, or any other persistent storage device. Computer system 800 (or a distributed application or operating system operating thereon) may store instructions and/or data in persistent storage devices 860, as desired, and may retrieve the stored instruction and/or data as needed. For example, in some embodiments, computer system 800 may host a storage system server node, and persistent storage 860 may include the SSDs attached to that server node.

Computer system 800 includes one or more system memories 820 that may store instructions and data accessible by processor(s) 810. In various embodiments, system memories 820 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement the methods and techniques described herein. In various embodiments, program instructions 825 may be encoded in platform native binary, any interpreted language such as Java™ byte-code, or in any other language such as C/C++, Java™, etc., or in any combination thereof. For example, in the illustrated embodiment, program instructions 825 include program instructions executable to implement the functionality of event bus system to generate probabilistic data structures such as bloom filters or implement event sources or event targets, in various embodiments.

In some embodiments, program instructions 825 may include instructions executable to implement an operating system (not shown), which may be any of various operating systems, such as UNIX, LINUX, Solaris™, MacOS™, Windows™, etc. Any or all of program instructions 825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In some embodiments, system memory 820 may include data store 845, which may be configured as described herein. For example, the information described herein as implementing the rules may be stored in data store 845 or in another portion of system memory 820 on one or more nodes, in persistent storage 860, and/or on one or more remote storage devices 870, at different times and in various embodiments. Similarly, the information described herein as being stored by the storage tier (e.g., events data, rules, and/or probabilistic data structures) may be stored in data store 845 or in another portion of system memory 820 on one or more nodes, in persistent storage 860, and/or on one or more remote storage devices 870, at different times and in various embodiments. In general, system memory 820 (e.g., data store 845 within system memory 820), persistent storage 860, and/or remote storage 870 may store data blocks, replicas of data blocks, metadata associated with data blocks and/or their state, database configuration information, and/or any other information usable in implementing the methods and techniques described herein.

In one embodiment, I/O interface 830 may coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may allow data to be exchanged between computer system 800 and other devices attached to a network, such as other computer systems 890. In addition, network interface 840 may allow communication between computer system 800 and various I/O devices 850 and/or remote storage 870. Input/output devices 850 may, in some embodiments, include one or more display terminals, keyboards, keypads, touchpads, scanning devices, voice or optical recognition devices, or any other devices suitable for entering or retrieving data by one or more computer systems 800. Multiple input/output devices 850 may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computer system 800 may include more, fewer, or different components than those illustrated in FIG. 8 (e.g., displays, video cards, audio cards, peripheral devices, other network interfaces such as an ATM interface, an Ethernet interface, a Frame Relay interface, etc.)

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. An event bus system, comprising:
   at least one processor; and
   a memory, storing program instructions that when executed by the at least one processor cause the at least one processor to:
   send first events received from a plurality of event sources to one or more event targets of a plurality of event targets according to rules describing condition for the event bus system to send the first events to the one or more event targets, the rules being specified via an interface for the event bus system;
   generate, from the rules, a bloom filter that indicates second events that would not be sent to any of the plurality of event targets according to the condition described by the rules; and
   send respective copies of the bloom filter to event sources associated with the second events to be applied by the event sources to stop sending the second events to the event bus system that would not be sent by the event bus system to any of the plurality of event targets.

2. The event bus system of claim 1, wherein the memory stores further instructions that when executed by the at least one processor, causes the at least one processor to:
   receive a request from one of the event sources for an updated version of the bloom filter; and
   send an updated bloom filter, generated based on a new rule or a modification to one of the rules that causes one of the first events no longer be sent to any of the plurality of event targets.

3. The event bus system of claim 1, wherein the memory stores further program instructions that when executed by the at least one processor cause the at least one processor to:
   receive, via the interface for the event bus system, a new rule or a modification to one of the rules that causes one of the first events to no longer be sent to any of the plurality of event targets;
   generate an update to at least a portion of the bloom filter according to the new rule or the modification to one of the rules; and
   send, the update to the portion of the bloom filter to the event sources associated with the one of the first events to update the respective copies of the bloom filter at the event sources associated with the one of the first events.

4. The event bus system of claim 1, wherein the bloom filter is a first bloom filter, and wherein the memory stores further program instructions that when executed by the at least one processor cause the at least one processor to:
   generate a second bloom filter, wherein the second bloom filter indicates a different set of first events that would not be sent to any of the plurality of event targets according to a new rule or a modification to one of the rules that causes one of the first events no longer be sent to any of the plurality of event targets; and
   send respective copies of the second bloom filter to the event sources, wherein the second bloom filter is used as a secondary filter in addition to the first bloom filter which is used as a primary filter until the secondary bloom filter replaces the first bloom filter.

5. A method, comprising:
   receiving, at an event bus system, rules for sending first events received from a plurality of event sources at the event bus system to one or more event targets of a plurality of event targets;
   generating, by the event bus system, a probabilistic data structure that indicates second events that would not be sent to any of the plurality of event targets according to the rules; and
   sending, by the event bus system, respective copies of the probabilistic data structure to the event sources associated with the second events to be applied by the event sources to stop sending the second events to the event bus system that would not be sent by the event bus system to any of the plurality of event targets.

6. The method of claim 5, wherein the probabilistic data structure is a bloom filter and wherein generating the bloom filter comprises applying one or more respective hash functions to set bits in an array to indicate the second events that would not be sent to the plurality of event targets according to the rules.

7. The method of claim 5, wherein the probabilistic data structure is a first probabilistic data structure, and wherein the first probabilistic data structure is assigned a first version identifier, and wherein the method further comprises:
generate, by the event bus system, a second probabilistic data structure, wherein the second probabilistic data structure indicates a different set of first events that would not be sent to any of the plurality of event targets according to a new rule or a modification to one of the rules that causes one of the first events no longer be sent to any of the plurality of event targets, wherein the second probabilistic data structure is assigned a second version identifier;
responsive to receiving an event from one of the event sources that indicates the first probabilistic data structure was used according to the first version identifier, sending, by the event bus system, the second probabilistic data structure to the one event source to replace the first probabilistic data structure.

8. The method of claim 5, further comprising:
receiving, by the event bus system, a request from one of the event sources for an updated version of the probabilistic data structure; and
sending, by the event bus system, an updated probabilistic data structure generated based on a new rule or a modification to one of the rules that causes one of the first events no longer be sent to any of the plurality of event targets.

9. The method of claim 5, wherein the probabilistic data structure is a bloom filter, and wherein the method further comprises:
receiving, at the event bus system, a new rule or a modification to one of the rules that causes one of the first events no longer be sent to any of the plurality of event targets;
sending, by the event bus system to at least one of the event sources, an update to a portion of the bloom filter to update the respective copy of the bloom filter at the at least one event source without updating another portion of the respective copy of the bloom filter.

10. The method of claim 5, further comprising:
after generating an update to the probabilistic data stricture, sending, by the event bus system, the update to the event sources to be applied to the respective copies of the probabilistic data structure.

11. The method of claim 5,
wherein respective ones of the first events received includes a description of the event source generating the respective ones of the events; and
wherein the probabilistic data structure is a source specific probabilistic data structure that indicates second events that would not be sent to any of the plurality of event targets according a plurality of source specific rules wherein the source specific rules are rules that matches the description of the event source.

12. The method of claim 5, wherein the probabilistic data structure is a bloom filter, and wherein the method further comprises:
receiving, via an interface for the event bus system, a new rule or a modification to one of the rules that causes one of the first events no longer be sent to any of the plurality of event targets;
generating, by the event bus system, an update to at least a portion of the probabilistic data structure according to the new rule or the modification to one of the rules; and
sending, by the event bus system, the update to the portion of the bloom filter to the event sources associated with the first events to update the respective copies of the probabilistic data structure at the event sources associated with the first events.

13. The method of claim 5, wherein the probabilistic data structure is a first probabilistic data structure, and further comprising:
generating, by the event bus system, a second probabilistic data structure, wherein the second probabilistic data structure indicates a different set of first events that would not be sent to any of the plurality of event targets according to a new rule or a modification to one of the rules that causes one of the first events no longer be sent to any of the plurality of event targets; and
sending, by the event bus system, respective copies of the second probabilistic data structure to the event sources, wherein the second probabilistic data structure is used as a secondary filter in addition to the first probabilistic data structure which is used as a primary filter until the secondary probabilistic data structure replaces the first probabilistic data structure.

14. One or more non-transitory, computer-readable storage media, storing program instructions that when executed on or across one or more computing devices cause the one or more computing devices to implement:
receiving, via an interface for an event bus system, rules for sending first events received from a plurality of event sources at the event bus system to one or more event targets of a plurality of event targets;
causing a probabilistic data structure that indicates second events that would not be sent to any of the plurality of event targets according to the rules; and
sending respective copies of the probabilistic data structure to the event sources to be applied by the event sources to stop sending the second events to the event bus system that would not be sent by the event bus system to any of the plurality of event targets.

15. The one or more non-transitory, computer-readable storage media of claim 14, wherein the probabilistic data structure is a bloom filter and wherein, in generating the bloom filter, the program instructions cause the one or more computing devices to implement applying one or more respective hash functions to set bits in an array to indicate the second events that would not be sent to the plurality of event targets according to the rules.

16. The one or more non-transitory, computer-readable storage media of claim 14, storing further instructions that when executed on or across the one or more computing devices, cause the one or more computing devices to further implement:
receiving a request from one of the event sources to determine one or more changes in the rules; and
sending, based on the one or more changes in the rules, respective copies of an updated probabilistic data structure wherein the updated probabilistic data structure indicates second events that would not be sent to any of the plurality of event targets according to the rules including the one or more changes.

17. The one or more non-transitory, computer-readable storage media of claim 14, storing further instructions that when executed on or across the one or more computing devices, cause the one or more computing devices to further implement:

receiving, at the event bus system, one or more changes to the rules for sending first events received from the event sources to the one or more event targets of the plurality of event targets;

sending, after the one or more changes in the rules, by the event bus system to the event sources, respective copies of an update of the probabilistic data structure wherein the update modifies the probabilistic data structure to stop sending the second events to the event bus system that would not be sent by the event bus system to any of the plurality of event targets based on the one or more changes.

18. The one or more non-transitory, computer-readable storage media of claim 14, wherein the event bus system assigns the probabilistic data structure an expiration time.

19. The one or more non-transitory, computer-readable storage media of claim 14, wherein the probabilistic data structure is a bloom filter and wherein, the storage media store further instructions that when executed on or across the one or more computing devices, cause the one or more computing devices to further implement:

receiving, via an interface for the event bus system, a new rule or a modification to one of the rules that causes one of the first events no longer be sent to any of the plurality of event targets;

generating, by the event bus system, an update to at least a portion of the probabilistic data structure according to the new rule or the modification to one of the rules; and sending, by the event bus system, the update to the portion of the bloom filter to the event sources associated with the first events to update the respective copies of the probabilistic data structure at the event sources associated with the first events.

20. The one or more non-transitory, computer-readable storage media of claim 14, wherein the probabilistic data structure is a first probabilistic data structure, and wherein the storage media store further instructions that when executed on or across the one or more computing devices, cause the one or more computing devices to further implement:

generating, by the event bus system, a second probabilistic data structure, wherein the second probabilistic data structure indicates a different set of first events that would not be sent to any of the plurality of event targets according to a new rule or a modification to one of the rules that causes one of the first events no longer be sent to any of the plurality of event targets; and sending, by the event bus system, respective copies of the second probabilistic data structure to the event sources, wherein the second probabilistic data structure is used as a secondary filter in addition to the first probabilistic data structure which is used as a primary filter until the secondary probabilistic data structure replaces the first probabilistic data structure.

* * * * *